(12) United States Patent
Stewart

(10) Patent No.: US 12,421,829 B2
(45) Date of Patent: Sep. 23, 2025

(54) COMBINED CARBON DIOXIDE DISPOSAL AND FRESHWATER PRODUCTION FROM A SALINE AQUIFER

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 527 days.

(21) Appl. No.: 17/481,082

(22) Filed: Sep. 21, 2021

(65) Prior Publication Data

US 2023/0087878 A1    Mar. 23, 2023

(51) Int. Cl.
| | | |
|---|---|---|
| *E21B 41/00* | (2006.01) | |
| *B01D 53/14* | (2006.01) | |
| *B01D 53/18* | (2006.01) | |
| *B01F 23/231* | (2022.01) | |
| *B01F 27/112* | (2022.01) | |

(Continued)

(52) U.S. Cl.
CPC ...... *E21B 41/0064* (2013.01); *B01D 53/1475* (2013.01); *B01D 53/1493* (2013.01); *B01D 53/18* (2013.01); *B01F 23/2312* (2022.01); *B01F 27/112* (2022.01); *B01F 27/191* (2022.01); *B65G 5/00* (2013.01); *C02F 1/441* (2013.01); *E03B 3/08* (2013.01); *B01D 2252/103* (2013.01); *C02F 2103/10* (2013.01);
(Continued)

(58) Field of Classification Search
CPC ......... E21B 41/0064; E03B 3/08; B65G 5/00; B01F 23/2312; B01F 27/112; B01F 27/191; B01D 53/1475; B01D 53/1493; B01D 53/18; B01D 2252/103; C02F 1/441; C02F 2103/10; C02F 2201/009; H02S 10/00
See application file for complete search history.

(56) References Cited

U.S. PATENT DOCUMENTS 5,791,780 A * 8/1998 Bakker ............... B01F 27/1123
                                                              261/93
6,446,014 B1    9/2002 Ocondi
(Continued)

FOREIGN PATENT DOCUMENTS

CN         105089658 B      4/2018
WO         WO 01/42621       6/2001
(Continued)

OTHER PUBLICATIONS

Ahmed et al., "Brine Disposal from Inland Desalination Plants: Current Status, Problems, and Opportunities," The EnviroComp Institute, Chapter 4 of Environmental Sciences and Environmental Computing, 2004, 2, 31 pages.

(Continued)

*Primary Examiner* — Amber R Anderson
*Assistant Examiner* — Stacy N Lawson
(74) *Attorney, Agent, or Firm* — Fish & Richardson P.C.

(57) ABSTRACT

A method and a system for sequestering carbon dioxide ($CO_2$) while producing freshwater are provided. An exemplary method includes producing saline water from a saline aquifer, desalinating at least a portion of the saline water, producing freshwater and waste brine, mixing waste $CO_2$ with the waste brine forming a brine/$CO_2$ mixture, and injecting the brine/$CO_2$ mixture into the saline aquifer.

19 Claims, 3 Drawing Sheets

(51) Int. Cl.

| | | |
|---|---|---|
| *B01F 27/191* | (2022.01) | |
| *B65G 5/00* | (2006.01) | |
| *C02F 1/44* | (2023.01) | |
| *E03B 3/08* | (2006.01) | |
| *C02F 103/10* | (2006.01) | |
| *H02S 10/00* | (2014.01) | |

(52) U.S. Cl.
CPC ......... *C02F 2201/009* (2013.01); *H02S 10/00* (2013.01)

(56) References Cited

U.S. PATENT DOCUMENTS

| | | | |
|---|---|---|---|
| 6,549,854 B1 | 4/2003 | Malinverno et al. | |
| 7,359,844 B2 | 4/2008 | Sung et al. | |
| 8,213,261 B2 | 7/2012 | Imhof et al. | |
| 8,360,148 B2 | 1/2013 | Atwood et al. | |
| 8,417,497 B2 | 4/2013 | Osypov et al. | |
| 8,423,337 B2 | 4/2013 | Hsu et al. | |
| 8,523,487 B2 | 9/2013 | Georgiou et al. | |
| 8,670,288 B2 | 3/2014 | Bjerkholt | |
| 8,812,334 B2 | 8/2014 | Givens et al. | |
| 8,849,640 B2 | 9/2014 | Holl et al. | |
| 8,892,407 B2 | 11/2014 | Budiman et al. | |
| 8,908,925 B2 | 12/2014 | Hurley | |
| 8,931,580 B2 | 1/2015 | Cheng et al. | |
| 9,008,972 B2 | 4/2015 | Imhof et al. | |
| 9,022,129 B2 | 5/2015 | Dobin et al. | |
| 9,134,457 B2 | 9/2015 | Hurley et al. | |
| 9,586,759 B2 | 3/2017 | De Koeijer et al. | |
| 9,593,558 B2 | 3/2017 | Sequeira, Jr. et al. | |
| 10,013,800 B1 | 7/2018 | Mallet et al. | |
| 10,323,499 B2 | 6/2019 | Dykstra et al. | |
| 10,370,955 B2 | 8/2019 | De Prisco | |
| 10,385,678 B2 | 8/2019 | Nguyen | |
| 10,822,938 B2 | 11/2020 | Zhu et al. | |
| 10,829,913 B1* | 11/2020 | Ahmed | B01D 61/025 |
| 10,914,864 B2 | 2/2021 | Bratvedt et al. | |
| 10,948,617 B2 | 3/2021 | Qin et al. | |
| 2006/0136162 A1 | 6/2006 | Hamman et al. | |
| 2009/0043507 A1 | 2/2009 | Dommisse et al. | |
| 2010/0191514 A1 | 7/2010 | Massonnat | |
| 2010/0326924 A1* | 12/2010 | Georgiou | E21B 41/0064 210/768 |
| 2011/0035154 A1* | 2/2011 | Kendall | C04B 28/10 422/111 |
| 2011/0098996 A1 | 4/2011 | Nichols et al. | |
| 2011/0320182 A1 | 12/2011 | Dommisse et al. | |
| 2012/0048618 A1 | 3/2012 | Zamanian et al. | |
| 2012/0211409 A1* | 8/2012 | Dubowsky | B01D 61/10 210/251 |
| 2013/0170910 A1* | 7/2013 | Hoier | B65G 5/00 405/53 |
| 2014/0081613 A1 | 3/2014 | Dommisse et al. | |
| 2014/0212937 A1* | 7/2014 | Li | B01F 23/29 435/150 |
| 2014/0278110 A1 | 9/2014 | Chugunov et al. | |
| 2015/0073715 A1 | 3/2015 | Aarre et al. | |
| 2015/0120199 A1 | 4/2015 | Casey | |
| 2015/0343368 A1* | 12/2015 | Koo | B01D 53/1425 96/6 |
| 2016/0025877 A1 | 1/2016 | Ramfjord et al. | |
| 2016/0040514 A1 | 2/2016 | Rahmani et al. | |
| 2018/0171768 A1* | 6/2018 | Tiffany, III | C02F 9/00 |
| 2019/0034812 A1 | 1/2019 | Borrel et al. | |
| 2019/0383965 A1 | 12/2019 | Salman et al. | |
| 2020/0055672 A1* | 2/2020 | Keshner | B01F 23/2321 |
| 2020/0200929 A1 | 6/2020 | Sepehrnoori et al. | |
| 2020/0242286 A1 | 7/2020 | Marchidan et al. | |
| 2021/0102457 A1 | 4/2021 | Dupont et al. | |
| 2021/0189840 A1 | 6/2021 | Albinali | |
| 2021/0262320 A1* | 8/2021 | Nguyen | E21B 41/0064 |
| 2022/0219112 A1* | 7/2022 | Sigfússon | B01D 53/62 |

FOREIGN PATENT DOCUMENTS

| | | | |
|---|---|---|---|
| WO | WO 2005051069 | 6/2005 | |
| WO | WO 2009055152 | 4/2009 | |
| WO | WO-2013086895 A1 * | 6/2013 | ............ F01D 17/00 |
| WO | WO 2013119245 | 8/2013 | |
| WO | WO 2016144842 | 9/2016 | |
| WO | WO 2019243857 | 12/2019 | |

OTHER PUBLICATIONS

Al Suleimani et al., "Desalination by solar-powered reverse osmosis in a remote area of the Sultanate of Oman," Applied Energy, Apr. 2000, 65(1-4): 367-380, 14 pages.

Al-Chalabi, "Parameter nonuniqueness in velocity versus depth functions," Geophysics, 62(3), May-Jun. 1997, 970-979, 10 pages.

Aminu et al., "A review of developments in carbon dioxide storage," Applied Energy, 2017, 208: 1389-1419, 31 pages.

Archie, "The electrical resistivity log as an aid in determining some reservoir characteristics." Transactions of the AIME 146.01, Dec. 1942, 54-62, 9 pages.

Atashbari and Tingay, "Pore pressure prediction in carbonate reservoirs," SPE 150835, Society of Petroleum Engineers (SPE), presented at the SPE Latin American and Caribbean Petroleum Engineering Conference, Mexico City, Mexico, Apr. 16-18, 2012, 20 pages.

Bachu and Adams, "Sequestration of CO2 in geological media in response to climate change: capacity of deep saline aquifers to sequester CO2 in solution," Energy Conversion and Management, Dec. 2003, 44(20): 3151-3175, 25 pages.

Basile et al., "TrackDip: A multi-scale processing of dipmeter data—Method, tests, and field example for 3-D description of gravity-driven deformations in the Eocene foreland basin of Ainsa, Spain," Marine & Petroleum Geology, 2009, 26:738-751, 14 pages.

Beaumont et al., "Treatise of Petroleum Geology/Handbook of Petroleum Geology: Exploring for Oil and Gas Traps. Chapter 5: Formation Fluid Pressure and Its Application." 1999, 64 pages.

Bergbauer et al., "Improving curvature analyses of deformed horizons using scale-dependent filtering techniques" American Association of Petroleum Geologists Bulletin, 87, Aug. 2003, 1255-1272, 18 pages.

Blake, "Quantifying Depth Uncertainty", LinkedIN Pulse Article, Dec. 14, 2016, 7 pages.

Bowers, "Detecting high overpressure." The leading edge 21.Feb. 2, 2002, 174-177, 4 pages.

Bradley et al., "Properties of produced waters." Petroleum Engineering Handbook, 1987, 25 pages.

Bulow, "Spherical Diffusion for 3D Surface Smoothing" IEEE Transactions on Pattern Analysis and Machine Intelligence, 26, Dec. 2004, 1650-1654, 5 pages.

Burton et al., "Eliminating Buoyant Migration of Sequestered CO2 Through Surface Dissolution: Implementation Costs and Technical Challenges," SPE Reservoir Evaluation & Engineering, Jun. 2009, 9 pages.

Buscheck et al., "Pre-injection brine production in CO2 storage reservoirs: An approach to augment the development, operation, and performance of CCS while generating water," International Journal of Greenhouse Gas Control, May 2016, 54: 499-512, 14 pages.

Calabrese, "Extension of Vibrating-Wire Viscometry to Electrically Conducting Fluids and Measurements of Viscosity and Density of Brines with Dissolved CO2 at Reservoir Conditions," J. Chem. Eng. Data 2019, 64, 9, 3831-3847, 17 pages.

Ccsnorway.com [online], "CCS Norway," Gassnova, available on or before May 16, 2020, via Internet Archive: Wayback Machine URL <http://web.archive.org/web/20200516132047/https://ccsnorway.com/>, retrieved on Nov. 23, 2021, URL <https://ccsnorway.com/>.

Celia, "Geological storage of captured carbon dioxide as a large-scale carbon mitigation option," Water Resources Research, Apr. 2017, 21 pages.

Coursehero.com [online], "Automatic Dip Computation with FMI data," available on or before 2021, retrieved on Mar. 11, 2021,

(56) References Cited

OTHER PUBLICATIONS retrieved from URL <https://www.coursehero.com/file/p2gvqajt/Automatic-Dip-Computation-with-FMI-Data-In-Techlog-automatic-dip-computation-is/>, 22 pages.

Cronin, "Finding the Mean and 95 Percent Confidence Interval of a Set of Strike-and-Dip or Lineation Data" Environmental & Engineering Geoscience, 14, May 2008, 113-119, 7 pages.

Dataplot Reference Manual, Weighted Standard Deviation, Sep. 1996, 2 pages.

De Wardt et al., "Wellbore collision avoidance and interceptions—State of the art," SPE/IADC 163411, presented at the SPE/IADC Drilling Conference, Amsterdam, The Netherlands, Mar. 5-7, 2013, 12 pages.

Dgi.com [online], "A Statistical Approach to Depth Uncertainty Analysis for Model Integrity" Aug. 2020, [retrieved on Jul. 8, 2021], retrieved from: URL <https://www.dgi.com/blog/depth-uncertainty-analysis/>, 8 pages.

Dickey, "Increasing concentration of subsurface brines with depth." Chemical Geology 4.1-2, Mar. 1969, 361-370, 10 pages.

Difeng et al., "A new calculation approach of wellbore separation factor based on the relative position of adjacent wells," Petroleum Exploration and Development, Feb. 2020, 47(1):196-203, 8 pages.

Duan et al., "An improved model calculating $CO_2$ solubility in pure water and aqueous NaCl solutions from 273 to 533 K and from 0 to 2000 bar," Chemical Geology, Feb. 2003, 193(3-4): 257-271.

Etris et al., "True depth conversion: More than a pretty picture," Recorder, CSEG, Nov. 2002, 26(9):1-19, 19 pages.

Finkbeiner et al., "Stress, pore pressure, and dynamically constrained hydrocarbon columns in the South Eugene Island 330 field, northern Gulf of Mexico," American Association of Petroleum Geologists (AAPG), American Association of Petroleum Geologists Bulletin, Jun. 2001, 85(6):1007-1031, 25 pages.

Galic et al., "$CO_2$ Injection Into Depleted Gas Reservoirs," SPE-123788-MS, Paper presented at the SPE Offshore Europe Oil and Gas Conference and Exhibition, Aberdeen, UK, Sep. 2009, 15 pages.

Garcia et al., "Density of Aqueous Solutions of $CO_2$," OSTI Technical Report, Oct. 2001, 9 pages.

Ghenai et al., "Grid-tied and stand-alone hybrid solar power system for desalination plant," Desalination, Jun. 2018, 435: 172-180, 9 pages.

Goodman et al., "Reconciling subsurface uncertainty with the appropriate well design using the mechanical Earth model (MEM) approach," The Leading Edge, May 2007, 26(5):545-672, 4 pages.

Hay, "Visualizing Scale-Domain Manifolds: A Multiscale Geo-Object Based Approach" In Weng, Q. (Ed.) Scale Issues in Remote Sensing. John Wiley & Sons Inc., 141-169, 31 pages.

Jahediesfanjani et al., "Estimating the pressure-limited $CO_2$ injection and storage capacity of the United States saline formations: Effect of the presence of hydrocarbon reservoirs," International Journal of Greenhouse Gas Control, 2018. 79: 14-24, 11 pages.

Jahediesfanjani et al., "Improving pressure-limited $CO_2$ storage capacity in saline formations by means of brine extraction," International Journal of Greenhouse Gas Control, 2019, 88: 299-310, 12 pages.

Jin et al., "Static and Dynamic Estimates of $CO_2$-Storage Capacity in Two Saline Formations in the UK," SPE J., Dec. 2012, 17 (04): 1108-1118, 11 pages.

Kim et al., "Partial desalination of hypersaline brine by lab-scale ion concentration polarization device," Desalination, Jun. 2017, 412: 20-31, 12 pages.

Leahy et al., "Uncertainty in subsurface interpretation: a new workflow," First Break, Sep. 2013, 31:87-93, 7 pages.

Li et al., "A method for calculating the liquid density for the $CO_2$—$H_2O$—NaCl system under $CO_2$ storage condition," Energy Procedia, 2011, 4: 3817-3824, 8 pages.

Li et al., "Anomalous Pore Pressure and its Relation with In-Situ Stress Regime in Deepwater Play," SPE 145686, Society of Petroleum Engineers (SPE), presented at the SPE Annual Technical Conference and Exhibition, Denver, Colorado, Oct. 30-Nov. 2, 2011, 6 pages.

Lindeberg, "Scale Selection" In: Computer Vision, Springer, 2021, 17 pages.

Marler, "Survey of multi-objective optimization methods for engineering" Structural and Multidisciplinary Optimization, 26, Mar. 2004, 369-395, 27 pages.

McCann et al., "Horizontal Well Path Planning and Correction Using Optimization Techniques," Journal of Energy Resources Technology, Sep. 2001, 123:187-193, 7 pages.

Mitasova et al., "Simultaneous Spline Approximation and Topographic Analysis for Lidar Elevation Data in Open-Source GIS" IEEE Geoscience and Remote Sensing Letters, 2, Oct. 2005, 375-379, 5 pages.

Mokhtarian et al., "A theory of multiscale, curvature-based shape representation for planar curves" IEEE Transactions on Pattern Analysis and Machine Intelligence, 14, Aug. 1992, 789-805, 17 pages.

Mynatt, "Using differential geometry to describe 3-D folds" Journal of Structural Geology, 29, Feb. 2007, 1256-1266, 11 pages.

Nasrabadi, et al., "Well placement optimization: A survey with special focus on application for gas/gas-condensate reservoirs," Journal of Natural Gas Science and Engineering, Mar. 2012, 5:6-16.

Nomeli et al., "A new model for the density of saturated solutions of $CO_2$—$H_2O$-NaClin saline aquifers," International Journal of Greenhouse Gas Control, Dec. 2014, 31: 192-204, 13 pages.

Northernlightsccs.com [online], "Accelerating decarbonisation," Northern Lights, available on or before Oct. 11, 2021, via Internet Archive: Wayback Machine URL <http://web.archive.org/web/20211011185110/https://northernlightsccs.com/>, retrieved on Nov. 23, 2021, URL <https://northernlightsccs.com/>.

Omar et al., "Pathways for integrated concentrated solar power—Desalination: A critical review," Renewable and Sustainable Energy Reviews, Mar. 2020, 119: 109609, 17 pages.

Pau et al., "High-resolution simulation and characterization of density-driven flow in $CO_2$ storage in saline aquifers," Advances in Water Resources, Apr. 2010, 33: 443-455.

Pool et al., "Dynamics and design of systems for geological storage of dissolved $CO_2$," Advances in Water Resources, Dec. 2013, 62 Part C: 533-542, 10 pages.

Powley, "Pressures and hydrogeology in petroleum basins." Earth-Science Reviews 29.1-4, Oct. 1990, 215-226, 12 pages.

Rachmawati, "Critical depth uncertainty analysis for accurate well planning at Tangguh" Proceedings, Indonesian Petroleum Association, IPA17-386-G, May 2017, 11 pages.

Rosin, "Determining local natural scales of curves" Pattern Recognition Letters, 19, 1998, 63-75, 13 pages.

Saika et al., "3D A proposed methodology of 3D geomodeling while geosteering for optimum horizontal well placement and enhanced geological risk management," Indian Journal of Marine Geosciences, 2018, 47(4):826-830, 5 pages.

Schlumberger, "Techlog Help pages: Processing for dip variables," 2018, 3 pages.

Schulze-Riegert, et al., "Well Path Design Optimization Under Geological Uncertainty: Application to a Complex North Sea Field," SPE Russian Oil & Gas Technical Conference and Exhibition, Oct. 2010.

Sensia "OFM Brochure: Well and Reservoir Analysis Software" Intelligent Action, 2021, 3 pages.

Shariatipour et al., "An engineering solution for $CO_2$ injection in saline aquifers," International Journal of Greenhouse Gas Control, Aug. 2016, 53: 98-105.

Sigfusson et al., "Solving the carbon-dioxide buoyancy challenge: The design and field testing of a dissolved $CO_2$ injection system," International Journal of Greenhouse Gas Control, Jun. 2015, 37: 213-219, 7 pages.

Squire et al., "probGRV: a workflow for geostatistical depth conversion and probabilistic assessment of gross rock volume." The APPEA Journal 54.1, 2014, 91-106, 16 pages.

Stamm et al., "Actors, actions, and uncertainties: optimizing decision-making based on 3-D structural geological models" Solid Earth, v. 10, Mar. 2019, 2015-2043, 29 pages.

(56) References Cited

OTHER PUBLICATIONS

Steele-Macinnis et al., "Volumetrics of CO2 Storage in Deep Saline Formations," Environ. Sci. Technol., 2013, 47, 1, 79-86, 8 pages.

Stewart et al., "Generalization and multiscale structure of subsurface structural maps," Interpretation, 2018, 6:T1045-T1054, 10 pages.

Stewart et al., "Scale dependence of strike and dip in sedimentary basins: Implications for field measurements and integrating subsurface datasets," Journal of Structural Geology, 2020, 131, 21 pages.

Stewart, et al., "Multiscale structure in sedimentary basins" Basin Research, 16, 2005, 183-197, 15 pages.

Suppe, "Fluid overpressures and strength of the sedimentary upper crust," Journal of Structural Geology, Dec. 2014, 69(B):481-492, 12 pages.

Tacher et al., "Geological uncertainties associated with 3-D subsurface models," Computers & Geosciences, 2006, 32:212-221, 10 pages.

Thompson et al., "Designing and validating 2D reservoir models," SPE-188066-MS, presented at the SPE Kingdom of Saudi Arabia Annual Technical Symposium and Exhibition, Dammam, Saudi Arabia, Apr. 24-27, 2017, 13 pages.

Thore et al., "Structural uncertainties: Determination, management and applications," Geophysics, May-Jun. 2002, 67(3):840-852.

Totake et al., "Structural validation as an input into seismic depth conversion to decrease assigned structural uncertainty," Journal of Structural Geology, 2017, 95:32-47, 16 pages.

Traugott, "Pore/fracture pressure determinations in deep water," Deepwater Technology, Supplement to World Oil, 218(8), 1997, 8 pages.

Trieb et al., "Concentrating solar power for seawater desalination in the Middle East and North Africa," Desalination, Presented at the conference on Desalination and the Environment. Sponsored by the European Desalination Society and Center for Research and Technology Hellas (CERTH), Sani Resort, Halkidiki, Greece, Apr. 22-25, 2007, 220(1-3): 165-183, 19 pages.

Unger, "Detangling geologic imprints on depth uncertainty: A method for analysing overburden effects on depth prediction" The Leading Edge, May 2010, 552-558, 6 pages.

Unser, "Sampling—50 Years After Shannon" Proceedings of the IEEE, 88, Apr. 2000, 569-587, 19 pages.

Wang et al., "Optimal well placement under uncertainty using a retrospective optimization framework," SPE Journal, Mar. 2012, 112-121, 10 pages.

Wellmann & Caumon, "3-D Structural Geological Models: Concepts, Methods, and Uncertainties" Advances in Geophysics, v. 59, Aug. 2019, 95 pages.

Wellmann et al., "Validating 3-D structural models with geological knowledge for improved uncertainty evaluations," Energy Procedia, 2014, 59:374-381, 8 pages.

Yan et al., "Measurement and modeling of CO2 solubility in NaCl brine and CO2-saturated NaCl brine density," International Journal of Greenhouse Gas Control, Nov. 2011, 5(6): 1460-1477, 18 pages.

Yardley and Swarbrick, "Lateral transfer: a source of additional overpressure?" Marine and Petroleum Geology, Apr. 1, 2000, 17(4):523-537, 15 pages.

Zhang et al., "Real-time pore pressure detection: indicators and improved methods." Geofluids, Jan. 2017, 12 pages.

Zhang, "Effective stress, porosity, velocity and abnormal pore pressure prediction accounting for compaction disequilibrium and unloading," Marine and Petroleum Geology, Aug. 2013, 45:2-11, 10 pages.

Zhang, "Pore pressure prediction from well logs: Methods, modifications, and new approaches." Earth-Science Reviews 108.1-2, Sep. 2011, 33 pages.

Zulauf, et al., "Quantification of the geometrical parameters of non-cylindrical folds" Journal of Structural Geology, 100, Jun. 2017, 120-129, 10 pages.

SAIP Examination Report in Saudi Arabian Appln. No. 122440226, dated Dec. 21, 2023, 12 pages.

* cited by examiner

100

COMBINED CARBON DIOXIDE DISPOSAL AND FRESHWATER PRODUCTION FROM A SALINE AQUIFER

TECHNICAL FIELD

The present disclosure is directed to the geological sequestration of carbon dioxide. More specifically, the production of fresh water from a saline aquifer with the reinjection of the waste brine mixed with waste carbon dioxide.

BACKGROUND

Carbon dioxide ($CO_2$) emissions into the atmosphere may contribute to adverse impacts of climate change. Therefore offsetting or reducing these $CO_2$ emissions by storing or sequestering $CO_2$ for long time-periods, such as thousands of years or longer, has attracted considerable research. Generally, the $CO_2$ can be captured directly at the point of emission, or it can be drawn from the atmosphere. Once captured it can be transported for injection into suitable underground long-term sequestration sites.

Regarding geological sedimentary basins, studies have focused on injection of pure $CO_2$ or, alternatively, solutions of $CO_2$ dissolved in water at various salinity levels. Studies have also linked the co-disposal of high-salinity brine, produced as a byproduct of desalination processes for freshwater production, with waste $CO_2$ from any source. However, the amount of energy required to overcome the existing pressure in the subsurface reservoir into which large quantities of $CO_2$ and or saline waters are injected is problematic. The energy requirements of injecting against progressively increasing reservoir pressure will introduce large and possibly prohibitive operating costs. Brine production has been studied for reducing pressure for CO2 injection, but disposal of the brine may be problematic.

SUMMARY

An embodiment described in examples herein provides method for sequestering carbon dioxide ($CO_2$) while producing freshwater. The method includes producing saline water from a saline aquifer, desalinating at least a portion of the saline water, producing freshwater and waste brine, mixing waste $CO_2$ with the waste brine forming a brine/$CO_2$ mixture, and injecting the brine/$CO_2$ mixture into the saline aquifer.

Another embodiment described in examples herein provides a system for sequestering carbon dioxide ($CO_2$) while producing freshwater. The system includes a production well drilled to a saline aquifer to produce saline water, and a desalination plant to produce freshwater from the saline water produced from the saline aquifer, and form a waste brine. The system includes a mixing plant to mix waste $CO_2$ with the waste brine, to form a brine/$CO_2$ mixture, and an injection well drilled to the saline aquifer to inject the brine/$CO_2$ mixture into the saline aquifer.

DETAILED DESCRIPTION

Embodiments described herein provide a method and a system for producing freshwater from water withdrawn from a saline aquifer while sequestering carbon dioxide ($CO_2$) in the same saline aquifer. This is performed by injecting the $CO_2$ into the saline aquifer in a mixture with the waste brine from the water purification process. The process may be powered by a co-located solar plant. The method is useful for inland, arid areas in equatorial geography that have ample sunlight and are short of fresh water.

While the integrated plant would be located in an area of suitable geology, the saline aquifer does not need to have a trapping configuration that would generally be needed for positively buoyant fluids such as hydrocarbons or pure $CO_2$, as the $CO_2$ may be dissolved in the waste brine from the freshwater production. Further, the disclosed techniques do not require seawater, so the integrated plant can be located inland wherever suitable geology exists, thus avoiding clash with other surface infrastructure.

Further, the waste brine from the desalination plant, which is mixed with the waste $CO_2$, is reinjected into the same reservoir as it was initially removed. Thus, the pressure increase that would be caused by the injection of the $CO_2$ is balanced by the pressure depletion from the removal of water during the desalination process. In addition to providing sequestration of $CO_2$, a number of other benefits obtained that are relevant to arid inland locations that typify equatorial regions. Specifically, the techniques produce freshwater and may lower power draw from external sources by utilizing a co-located solar energy plant.

The techniques described may provide long-term geological sequestration of $CO_2$, for example, for thousands of years, in an energy efficient manner. Further, the techniques produce freshwater for public consumption or agricultural use. The facility can be located in remote inland locations such as deserts to avoid existing civil infrastructure and can use solar energy as a primary source to drive the process. The complete process described by this invention is summarized in FIG. 1.

Figure 1:
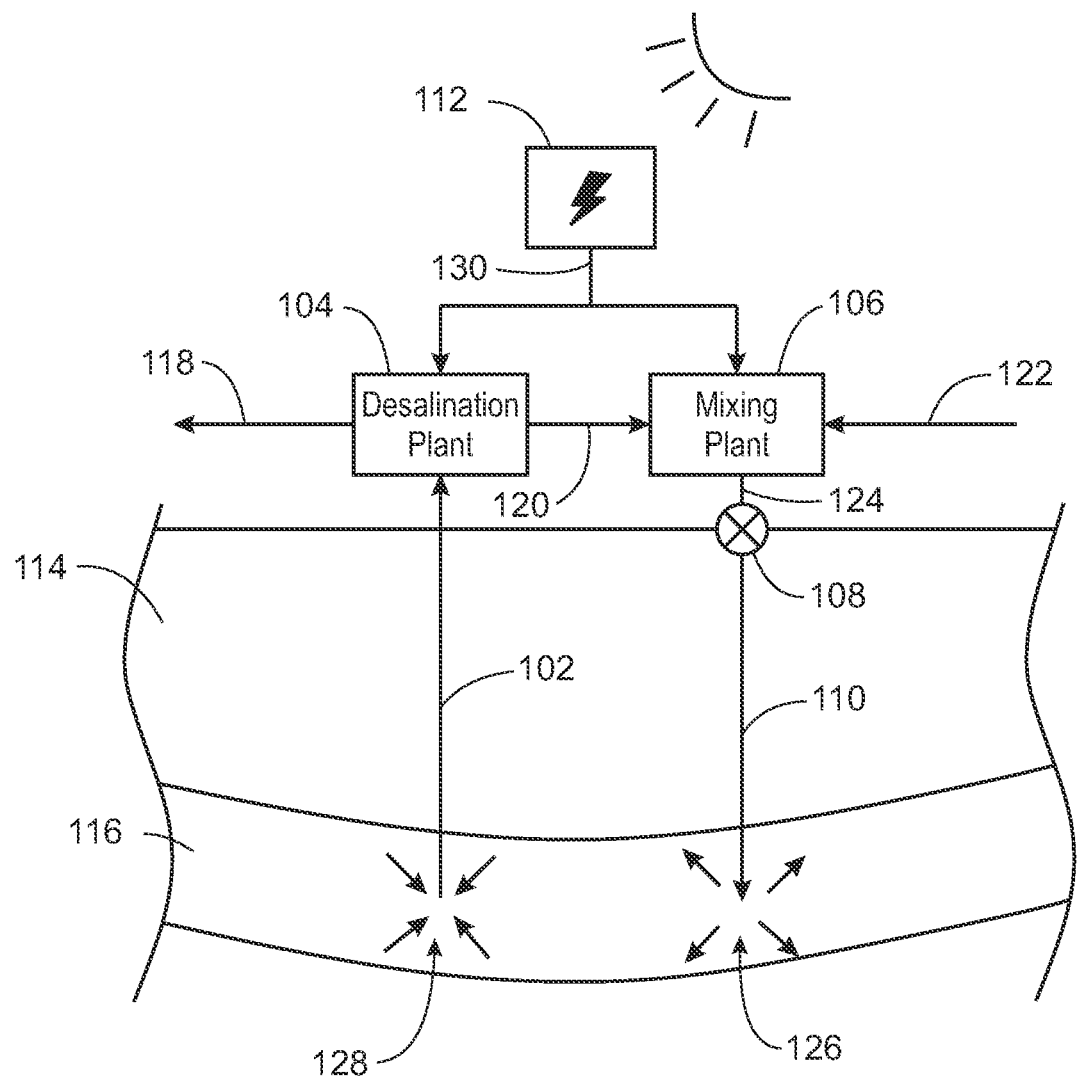
FIG. 1 is a schematic diagram of a $CO_2$ disposal facility.

FIG. 1 is a schematic diagram of a $CO_2$ disposal facility 100. The $CO_2$ disposal facility 100 includes a saline water production well 102, a desalination plant 104, a mixing plant 106, an injection pump 108, and a brine injection well 110. The $CO_2$ disposal facility 100 may also include a solar power plant 112.

The saline water production well 102 is drilled through a cap rock layer 114 to a saline aquifer 116. Salinity of reservoirs, such as a saline aquifer 116, in geological basins is variable from one basin and reservoir to another, but is typically in a range of about 35,000 mg/L, or approximately the same salinity as seawater, up to about 70,000 to 100,000 mg/L, considered hypersaline. These fluids would be produced from the reservoir via drilled wells. If the initial reservoir pressure is above hydrostatic, that is, higher than the pressure of a water column to the reservoir depth, then the reservoir waters may flow naturally to surface. Otherwise, a pump system may be required, such as an Electric Submersible Pump, to lift the reservoir water to surface.

Saline water, for example, water with total dissolved solids (TDS) of about 500 mg/L to about 250,000 mg/L, or about 10,000 mg/L to about 40,000 mg/L, or about 35,000 mg/L is produced from the saline aquifer 116. Assuming the salinity of the saline water produced from the saline aquifer 116 is higher than that acceptable for potable water, for example, less than about 500 mg/L TDS or agriculture, for example, less than about 2000 mg/L TDS, the water is provided to the desalination plant 104 for purification.

In some embodiments, the desalination plant 104 is a membrane purification plant using reverse osmosis membranes. Water purification by reverse osmosis generates a freshwater stream 118 and a waste brine stream 120. In some embodiments, the desalination plant 104 is a commercially available unit. Such units are available as skid mounted units available from Pure Aqua, Inc. of Santa Ana, Calif., USA, among others. These units may be scalable by the use of additional units. In other embodiments, for example, for large installations, the desalination plant 104 is built from individual components. For example, an individual well may produce brine at rates of 5,000-15,000 barrels per day (about 1,000-3,000 tons per day). A project big enough to be significant at national or a regional scale may include about 1,000-5,000 such wells, providing up to about 15 million tons of water production per day. Accordingly, as capacity is increased, larger desalination plants may be constructed to handle the flow rates.

Depending on the initial concentration of the TDS, the freshwater and the waste brine are generated in roughly equal amounts. In some embodiments, only a portion of the brine is processed in the desalination plant. The remainder may be injected into other reservoirs for enhanced oil production, or disposed of by other means. Lower amounts of TDS, such as less than about 5,000 mg/L, may generate higher amounts of freshwater, for example, at about 60%, or more, of the output from the desalination plant 104. Higher amounts of TDS, such as greater than about 35,000 mg/L, may generate lower amounts of freshwater, for example, at about 40%, or less, of the output from the desalination plant 104.

The freshwater stream 118 can be connected to potable water supply systems or used for local agriculture. In some embodiments, the freshwater stream 118 is coupled to a distribution system for providing water to an agricultural installation. In some embodiments, the freshwater stream 118 is used to provide water for the operators of the $CO_2$ disposal facility 100, as the $CO_2$ disposal facility 100 will generally be remotely located.

The waste brine stream 120 from the desalination plant 104 is provided to the mixing plant 106 to be blended with $CO_2$ from a waste $CO_2$ stream 122. In some embodiments, the mixing plant 106 includes a vessel that has a sparger disposed in the lower portion of the vessel. The sparger releases the $CO_2$ into waste brine in the vessel, allowing the $CO_2$ to dissolve in the waste brine. In some embodiments, multiple vessels are used in sequential stages in which downstream vessels capture $CO_2$ from the headspace of upstream vessels and sparge the $CO_2$ through additional portions of the waste brine. The mixing plant 106 is discussed further with respect to FIG. 3.

In other embodiments, the sparger is located at depth in an injection well. For example, the sparger may be a linear structure, such as a segment of perforated pipe. The $CO_2$ would be injected without mixing with the brine first. The $CO_2$ may then dissolve directly in the brine of the saline aquifer.

The amount of $CO_2$ that can be dissolved in the waste brine depends on the, pressure, temperature, and TDS concentration of the waste brine. Dissolution of the $CO_2$ solution increases the weight of brine by about 0.3%-0.8%. Accordingly, one ton of $CO_2$ would require some 250 tons of water or brine. In some embodiments, for example, when the cap rock layer 114 is not impervious, a brine/$CO_2$ mixture is formed in which the $CO_2$ is saturated in the brine. The determination of the saturation point for the brine/$CO_2$ mixture can be made based on the pressure, temperature, and chemistry of the saline aquifer 116.

In embodiments in which the cap rock 114 is impervious, the brine/$CO_2$ mixture may be oversaturated or even contain bubbles of $CO_2$. In these embodiments, the cap rock 114 forms a trap that will prevent release of the $CO_2$.

From the mixing plant 106, the brine/$CO_2$ stream 124 is provided to an injection pump 108 that injects 126 the brine/$CO_2$ mixture through the injection well 110 into the saline aquifer 116. Injection of fluids into a reservoir will meet with pressure resistance in proportion to existing reservoir pressure combined with the volume of injected material. Generally, the increase in the pressure of the saline aquifer 116 due to the injection 126 of the brine/$CO_2$ stream 124 is balanced by the decrease in the pressure of the saline aquifer 116 due to the production 128 of the saline water. Pressure depletion by saline fluid extraction in the integrated process described herein reduces the resistance to injection, making the process more energy efficient. For example, the decrease in the volume of the waste brine 120 versus the volume of the saline water produced 128 allows for more energy efficient injection of the brine/$CO_2$ mixture 124 into the saline aquifer 116.

Although the mix of $CO_2$ into brine itself can give a fluid density increase of up to about 0.80%, the waste brine from the desalination plant 104 will be significantly denser than the saline water in the saline aquifer 116. For example, the density of water increases linearly by some 3.5% per 50,000 ppm increase in TDS. Thus, the dissolved brine/$CO_2$ mixture will likely pool in the structurally deepest parts of the basin.

Accordingly, in some embodiments, the cap rock layer 114 does not need to be impervious. In these embodiments, the higher density of the brine/$CO_2$ mixture, in which the $CO_2$ is dissolved in the waste brine, settles to the base of the saline aquifer 116 trapping the $CO_2$. However, the techniques may also be used in reservoirs in which the cap rock layer 114 is impervious, allowing for the trapping of injected $CO_2$ below the cap rock layer 114.

The location of the $CO_2$ disposal plant 100 would be primarily driven by suitable geology, although other factors, such as existing CO2 pipelines, population centers, or unused fields will also be factors. A suitable geological location would have known porosity and permeability and, therefore, known reservoir potential for $CO_2$ sequestration. The subsurface architecture of the saline aquifer 116 can be determined from existing techniques such as reflection seismic imaging or drilled wells, among other techniques. To determine the properties of the saline aquifer 116, at least one well would be drilled into this reservoir to sample the rock properties and fluid properties of the in-situ formation waters. This could be an existing well that was drilled for other purposes, such as hydrocarbon exploration, or it could be a well intentionally drilled for $CO_2$ site exploration. Further, existing wells could be worked over to extend deeper into aquifers below abandoned fields.

Geological basins tend to be large, potentially giving wide areas in which to select a site. As described herein, various embodiments use negative buoyancy, for example, the sinking of the brine/$CO_2$ mixture below the saline water of the saline aquifer 116, and thus do not require structural highs or even impervious cap rock, which tend to be more restricted in geological basins. As the saline water is removed from the same saline aquifer 116 that the brine/$CO_2$ mixture is injected into, there is no requirement for seawater.

Therefore, as mentioned herein, the $CO_2$ disposal facility 100 is not tied to a coastline and can be located inland. This allows placement at a distance from existing infrastructure such as cities or coastal developments. In also allows the utilization of remote desert locations that have no other current use, as the $CO_2$ disposal facility 100 and solar power plant 112 generate energy and water needed for operators of the facility. Further, the footprint of the facility would be small relative to most deserts, and therefore environmental aspects of that desert location would not be significantly affected. The utilization of solar power is an option contingent on the prevailing climate. The $CO_2$ disposal facility 100 could be used to provide water and energy to create an agricultural facility, such as a farm, orchard, vineyard, and the like.

The waste $CO_2$ stream 122 may be provided from any source such as power generation, chemical engineering process, or even direct extraction from the atmosphere. In some embodiments, the waste $CO_2$ stream 122 is provided to the disposal facility through pipelines or alternative means of transport.

Desalination and water injection processes are energy intensive. Further energy savings are possible if the $CO_2$ disposal plant 100 is located in an area with high insolation, such as in a location near the equator. In some embodiments, the solar plant 112 provides at least a portion of the electrical power 130 required for the $CO_2$ disposal plant 100. The electrical power 130 may be used to power the desalination plant 104 as well as pumps that drive the water production, injection, and fluid transport in the surface lines. Further efficiencies are possible if the $CO_2$ disposal plant 100 is located on an abandoned hydrocarbon field since existing well stock could be utilized, significantly reducing the capital expenditure of the project.

In some embodiments, the solar plant 112 includes an array of photovoltaic cells, along with associated controls, inverters, and the like. In other embodiments, the solar plant 112 includes solar power concentrators that focus sunlight on an elevated boiler, which is used to drive thermal turbines. The solar plant 112 can be located locally to the $CO_2$ disposal plant 100, allowing the $CO_2$ disposal plant 100 to reduce or eliminate other power sources, such as power grids. The solar plant 100 can be sized to match peak power requirements from the desalination and pumping machinery. The solar plant 100 can be further augmented with a battery farm to store excess energy that can be used to run the main plant at night and through other times of low solar power availability.

A major capital expenditure associated with setting up this facility would be the wells drilled to the saline aquifer 116 for production of the saline water and injection of the waste brine/$CO_2$ mixture. As noted herein, the capital expenditure could be significantly reduced by the use of existing wells, for example, in an abandoned oil or gas field. As large oil and gas fields often have several hundred wells, it may be possible to repurpose some or all of the wells for the production and injection duties described here. If using such well stock, there would be no restriction on using the same reservoir as previously drained for oil or gas production, so long as a saline aquifer can be accessed by the wells. Any reservoir penetrated by the wells could be accessed for the purposes of the described project.

Figure 2:
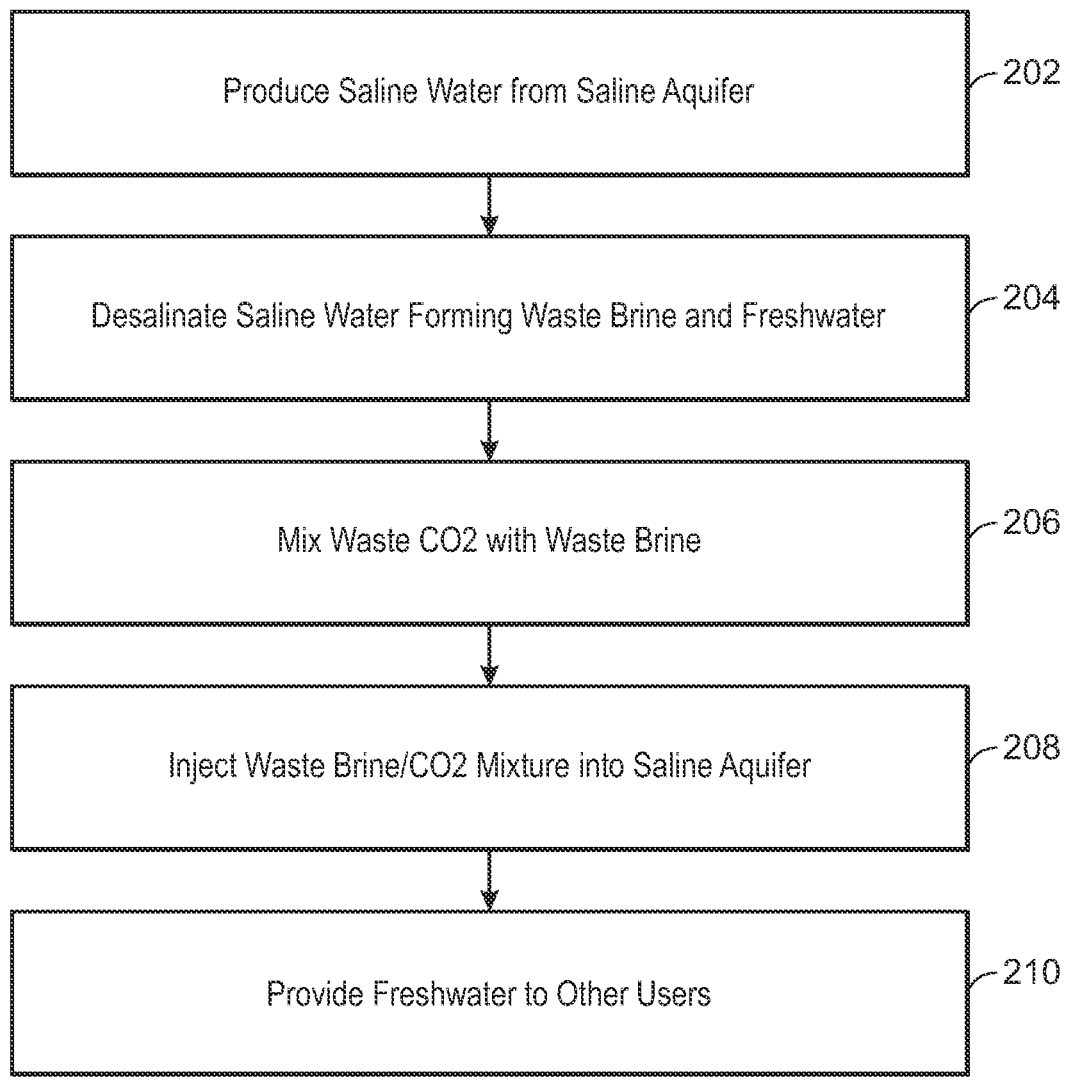
FIG. 2 is a process flow diagram of a method for sequestering carbon dioxide while producing freshwater from a saline aquifer.

FIG. 2 is a process flow diagram of a method 200 for sequestering carbon dioxide while producing freshwater from a saline aquifer. The method 200 begins at block 202 with the production of saline water from a saline aquifer.

At block 204, the saline water is desalinated forming a waste brine and freshwater. At block 206, waste $CO_2$ is mixed with the waste brine to form a waste brine/$CO_2$ mixture. In some embodiments, the waste brine/$CO_2$ mixture is a solution with $CO_2$ dissolved in the waste brine. In some embodiments, the $CO_2$ is saturated in the brine/$CO_2$ mixture.

At block 208, the waste brine/$CO_2$ mixture is injected into the saline aquifer. As this is the same saline aquifer from which the saline water was produced, the pressure may be balanced by the removal of the freshwater, lowering the energy requirements for injection of the waste brine/$CO_2$ mixture into the saline aquifer.

At block 210, the freshwater is provided to users. As described herein, the freshwater may be used for agricultural purposes, used to provide water for plant operations and personnel, or coupled to water supply systems for use off-site.

Figure 3:
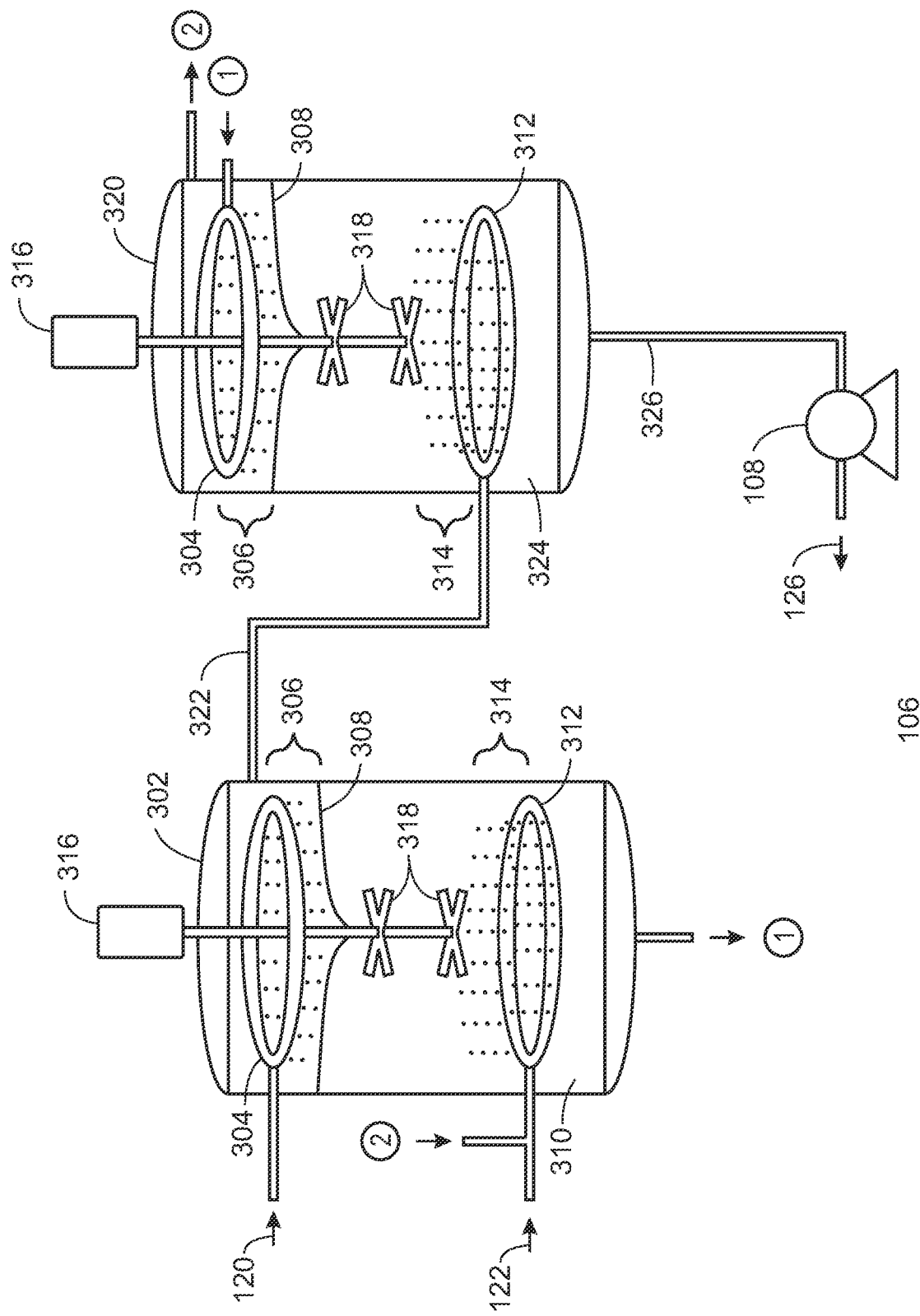
FIG. 3 is a simplified process flow diagram of a mixing plant that could be used in embodiments.

FIG. 3 is a simplified process flow diagram of a mixing plant 106 that could be used in embodiments. Like numbered items are as described with respect to FIG. 1. It should be noted that this is only one configuration that may be used in embodiments. In other configurations, the mixing may be performed by in-line mixers, mist mixers, and the like.

In this embodiment, the waste brine stream 120 is introduced into a first continuous stirred tank reactor (CSTR) 302, for example, through a spray ring 304. From the spray ring 304 droplets 306 of the waste brine fall through the headspace to the surface 308 of a waste brine/$CO_2$ mixture 310. The waste $CO_2$ stream 122 is introduced into the first CSTR 302 through a sparger 312, for example, disposed near the bottom of the first CSTR 302. Bubbles 314 of the $CO_2$ move up through the waste brine/$CO_2$ mixture 310, at least partially dissolving before reaching the surface 308. A mixer, including a motor 316 and mixing paddles 318 may be used to enhance the dissolution.

Depending on the amount of $CO_2$ that is to be dissolved in the waste brine, a second CSTR 320 may be placed in series with the first CSTR 302. For example, a line 322 can be used to carry $CO_2$ from the headspace of the first CSTR 302 to the second CSTR 320, where it is released from a sparger 312 in the second CSTR 320. As in the first CSTR 302, the $CO_2$ forms bubbles 314 in the waste brine/$CO_2$ mixture 324 in the second CSTR 320 that rise up towards the surface 308 of the waste brine/$CO_2$ mixture 324. The waste brine/$CO_2$ mixture 310 in the first CSTR 302 may be taken from the bottom and introduced into the second CSTR 320 through a spray ring 304, as indicated by the circled 1. The remaining $CO_2$ in the headspace of the second CSTR 320 may be added to the waste $CO_2$ stream 122 and injected into the sparger 312 in the first CSTR 302. Other stages may be added to increase the amount of $CO_2$ dissolved in the waste brine. Pressure control systems on the first CSTR 302 and the second CSTR 320 may be used to control the flow of the $CO_2$ into the first CSTR 302, for example, reducing the amount of CO2 introduced into the mixing plant 106 when the pressure reaches predetermined targets, such as the pressure of the saline aquifer.

From the second CSTR 320, the waste brine/$CO_2$ mixture 324 may be carried by an outlet line 326 to the injection pump 108. The waste brine/$CO_2$ mixture 324 is then injected 126 into the saline aquifer.

Embodiments

An embodiment described in examples herein provides method for sequestering carbon dioxide ($CO_2$) while producing freshwater. The method includes producing saline water from a saline aquifer, desalinating at least a portion of the saline water, producing freshwater and waste brine, mixing waste $CO_2$ with the waste brine forming a brine/$CO_2$ mixture, and injecting the brine/$CO_2$ mixture into the saline aquifer.

In an aspect, the method includes providing the freshwater to an agricultural site. In an aspect, the method includes providing the freshwater to operators of a plant facility.

In an aspect, the method includes producing electricity from a solar power plant. The electricity is provided to desalinate the saline water. The electricity is also provided to mix the waste $CO_2$ with the waste brine to form the brine/$CO_2$ mixture, and inject the brine/$CO_2$ mixture.

In an aspect, the method includes dissolving the waste $CO_2$ into the waste brine, wherein the brine/$CO_2$ mixture includes a solution. In an aspect, the method includes balancing the pressure in the saline aquifer between a pressure loss from producing the saline water from the saline aquifer and a pressure gain from injecting the brine/$CO_2$ mixture.

In an aspect, the method includes injecting the brine/$CO_2$ mixture into the saline aquifer under a cap rock. In an aspect, the method includes layering the brine/$CO_2$ mixture into the saline aquifer under the saline water. In an aspect, the saline aquifer does not include a cap rock.

Another embodiment described in examples herein provides a system for sequestering carbon dioxide ($CO_2$) while producing freshwater. The system includes a production well drilled to a saline aquifer to produce saline water, and a desalination plant to produce freshwater from the saline water produced from the saline aquifer, and form a waste brine. The system includes a mixing plant to mix waste $CO_2$ with the waste brine, to form a brine/$CO_2$ mixture, and an injection well drilled to the saline aquifer to inject the brine/$CO_2$ mixture into the saline aquifer.

In an aspect, the production well is a pre-existing well in an oilfield. In an aspect, the injection well is a pre-existing well in an oilfield. In an aspect, the system includes an injection pump to inject the brine/$CO_2$ mixture into the saline aquifer.

In an aspect, the system includes a solar power plant to provide electricity to the desalination plant and the mixing plant. In an aspect, the solar power plant includes photovoltaic cells. In an aspect, the solar power plant includes reflectors that focus sunlight on a boiler.

In an aspect, the system includes a freshwater distribution system to provide the freshwater to users. In an aspect, the system includes a $CO_2$ pipeline to provide the waste $CO_2$ to the mixing plant. In an aspect, the system includes an atmospheric extraction plant to extract the waste $CO_2$ from the atmosphere and provide the waste $CO_2$ to the mixing plant.

In an aspect, the mixing plant includes a continuous stirred tank reactor including a $CO_2$ sparger. In an aspect, the mixing plant includes multiple stages that contact waste brine with $CO_2$. In an aspect, the system includes a sparger placed in the saline aquifer.

Other implementations are also within the scope of the following claims.

What is claimed is:

1. A method for sequestering carbon dioxide ($CO_2$) while producing freshwater, the method comprising:
    producing saline water from a saline aquifer using a production well drilled to the saline aquifer;
    powering a reverse osmosis desalination plant with electricity from a solar power plant;
    desalinating at least a portion of the saline water in the reverse osmosis desalination plant, producing freshwater and waste brine;
    mixing waste $CO_2$ with the waste brine using a continuous stirred tank reactor (CSTR), forming a brine/$CO_2$ mixture that does not contain another brine or saline water other than the waste brine; and
    injecting the brine/$CO_2$ mixture into the saline aquifer, wherein the CSTR comprises:
        a mixing paddle;
        a spray ring disposed within a headspace of the CSTR to drop droplets of the waste brine; and
        a $CO_2$ sparger disposed near the bottom of the CSTR to provide bubbles of the waste $CO_2$.

2. The method of claim 1, comprising providing the freshwater to an agricultural site.

3. The method of claim 1, comprising providing the freshwater to operators of a plant facility.

4. The method of claim 1, comprising:
    providing the electricity from the solar power plant to mix the waste $CO_2$ with the waste brine to form the brine/$CO_2$ mixture; and
    providing the electricity from the solar plant to inject the brine/$CO_2$ mixture.

5. The method of claim 1, comprising dissolving the waste $CO_2$ into the waste brine, wherein the brine/$CO_2$ mixture comprises a solution.

6. The method of claim 1, comprising balancing the pressure in the saline aquifer between a pressure loss from producing the saline water from the saline aquifer and a pressure gain from injecting the brine/$CO_2$ mixture.

7. The method of claim 1, wherein the saline aquifer is under a cap rock.

8. The method of claim 1, comprising forming a layer of the brine/$CO_2$ mixture in the saline aquifer under the saline water.

9. The method of claim 8, wherein the saline aquifer does not comprise a cap rock.

10. A system for sequestering carbon dioxide ($CO_2$) while producing freshwater, the system comprising:
    a production well drilled to a saline aquifer to produce saline water;
    a solar power plant providing electricity to a desalination plant and a mixing plant;
    the desalination plant to produce freshwater from the saline water produced from the saline aquifer, and form a waste brine;
    the mixing plant to mix waste $CO_2$ with the waste brine, to form a brine/$CO_2$ mixture, the mixing plant comprising a continuous stirred tank reactor (CSTR), the CSTR comprising a mixing paddle, a spray ring disposed within a headspace of the CSTR to drop droplets of the waste brine, and a $CO_2$ sparger disposed near the bottom of the CSTR to provide bubbles of the waste $CO_2$; and
    an injection well drilled to the saline aquifer to inject the brine/$CO_2$ mixture into the saline aquifer.

11. The system of claim 10, wherein the production well is a pre-existing well in an oilfield.

12. The system of claim 10, wherein the injection well is a pre-existing well in an oilfield.

13. The system of claim 10, comprising an injection pump to inject the brine/$CO_2$ mixture into the saline aquifer.

14. The system of claim 10, wherein the solar power plant comprises photovoltaic cells.

15. The system of claim 10, wherein the solar power plant comprises reflectors that focus sunlight on a boiler.

16. The system of claim 10, comprising a freshwater distribution system to provide the freshwater to users.

17. The system of claim 10, comprising a $CO_2$ pipeline to provide the waste $CO_2$ to the mixing plant.

18. The system of claim 10, wherein the mixing plant comprises multiple stages that contact the waste brine with the waste $CO_2$.

19. The system of claim 10, comprising a sparger placed in the saline aquifer.

\* \* \* \* \*